(12) United States Patent
Wright

(10) Patent No.: US 7,188,584 B1
(45) Date of Patent: Mar. 13, 2007

(54) REMOVABLE CUP FEEDER ASSEMBLY AND IMPROVED CUP

(76) Inventor: A. Lee Wright, 3231 Jonathon, Oxford, MI (US) 48371

( * ) Notice: Subject to any disclaimer, the term of this patent is extended or adjusted under 35 U.S.C. 154(b) by 0 days.

(21) Appl. No.: 11/162,919

(22) Filed: Sep. 28, 2005

(51) Int. Cl.
*A01K 7/00* (2006.01)
(52) U.S. Cl. ....................................................... 119/464
(58) Field of Classification Search ........ 119/452–454, 119/456, 462, 464, 467, 468, 475, 477, 60, 119/61.1, 61.5, 61.57, 72, 72.5, 75
See application file for complete search history.

(56) References Cited

U.S. PATENT DOCUMENTS

| | | | |
|---|---|---|---|
| 5,467,733 A * | 11/1995 | Messina ...................... | 119/464 |
| 5,579,703 A | 12/1996 | King | |
| 5,738,042 A | 4/1998 | King | |
| 5,996,536 A | 12/1999 | King | |
| 6,390,022 B1 * | 5/2002 | Eichler et al. ................. | 119/72 |
| 6,435,134 B1 * | 8/2002 | Ho ............................... | 119/72 |
| 6,776,122 B1 * | 8/2004 | Magrath et al. ............ | 119/467 |
| 6,883,464 B2 * | 4/2005 | Kirch .......................... | 119/706 |

* cited by examiner

*Primary Examiner*—Thomas Price
(74) *Attorney, Agent, or Firm*—Gregory T. Zalecki

(57) ABSTRACT

A removable bird cup feeder assembly is comprised of a dish holder and a cup shaped dish. The dish holder has a slide rail, a vertical stop member, a horizontal stop member and a cage displacement member. The slide rail fits into a tunnel formed on the dish by a flange and a wall of the dish. The stop members limit horizontal and vertical movement of the dish. The fit between the flange and the slide rail limits rotation of the dish. The dish has an embossed floor, radiused floor and wall intersections, and radiused top wall surfaces to enhance bird comfort and to facilitate cleaning of the dish. The assembly is installed within a cage. When the cage door is opened, the dish may be quickly removed and replaced. When the cage door is closed the dish cannot be displaced by a bird within the cage.

8 Claims, 4 Drawing Sheets

REMOVABLE CUP FEEDER ASSEMBLY AND IMPROVED CUP

BACKGROUND

Many people raise and keep birds. They do this for recreation and in the pursuit of business. The birds must be kept in a cage. Otherwise, they would fly away. The cage must be equipped with a container for providing water for the birds. The container can be equipped, or used alternatively, to provide food for the birds. Such birdcage containers are also used by birds for nesting, bathing, eating and playing. Often the term container is referred to as a cup feeder, a bird cup feeder, a dish, a watering dish, a cup shaped dish, and the like by bird lovers.

A well-known problem exists with containers secured within birdcages. Birds attempt to move the containers in every possible direction. Some birds are quite large and can exert significant forces upon a container. If a birdcage container is not properly secured it easily comes off and falls to the cage floor when a bird strikes it. As a result, water and food are wasted and contaminate the cage floor. This requires a cleanup of the cage floor and resupplying of the container.

One solution is to firmly affix the container to a wall of the cage. While this may prevent a bird from upsetting the container, an additional problem is created. That container cannot be quickly removed and replaced. Food and water containers within birdcages need to be quickly removed and replaced. The container must be removed from the cage repeatedly for cleaning and replacement of food and water. Unfortunately, when the cage door is opened the bird within the cage often attempts to escape. Some birds attempt to attack their human handler when the cage door is opened and the handler inserts his or her hand into the cage. Therefore, it is desirable to minimize the time that the cage door is open while the container is attended to.

What is needed is a cage which incorporates an easily and quickly removable container. When in place with the cage door closed that container should not be able to be displaced by the bird within the cage.

The removable cup feeder assembly and the improved cage having a removable cup feeder described herein are primarily intended for use with birds. However, they may also be used with cages containing animals.

SUMMARY

A removable cup feeder assembly is comprised of a dish holder and a cup shaped dish. The assembly is intended for use within a cage which has an entrance door. The dish holder is intended to be attached to a wall of the cage.

The dish holder has a slide rail, a vertical stop member, at least one horizontal stop member and at least one cage displacement member. The dish holder can be fabricated from a malleable metallic rod. The slide rail has an upper section and a lower section. The slide rail removably retains the dish. It fits within a tunnel fabricated into the dish. The dish slides horizontally along the rail.

The vertical stop member limits vertical movement of the dish. It should be coplanar with the slide rail and positioned above the slide rail. It is positioned as so as to permit horizontal sliding movement of the dish, but to limit vertical movement of the dish. The slide rail can be in the form of an elongated U formed from the metal rod. The vertical stop member can also be in the form of an elongated U connected to the slide rail, wherein the vertical stop member is the uppermost leg of the U.

The dish holder has at least one horizontal stop member. The horizontal stop member limits horizontal movement of the dish away from the entrance door of the cage. Preferably, one of the horizontal stop members is a U-shaped section of the metallic rod connecting the slide rail to the vertical stop member.

The dish holder has at least one cage displacement member. The cage displacement member displaces the slide rail from a wall of the cage. This permits a flange on the cup shaped dish to fit between the slide rail and a wall of the cage to which the dish holder is attached. Preferably, one or more stanchions are attached to the slide rail-vertical stop member assembly by a cage displacement member. A stanchion and a cage displacement member can be formed from a free end of the metallic rod extending from either the slide rail or the vertical stop member. Preferably, one stanchion is attached to the slide rail and another stanchion is attached to the vertical stop member.

The cup shaped dish has an open end defined by a front wall, a back wall and two side walls. The dish has a flange attached to the open end portion of the back wall. The flange is attached to the back wall by an upper projection member. The plane of the flange is parallel to the plane of the back wall. The flange and the upper projection member are sized and shaped such that a slide tunnel for slidably receiving the slide rail is formed. The slide tunnel is sized and shaped such that when the tunnel is fit onto the slide rail, contact between the flange-projection member assembly and the at least one horizontal stop member limits horizontal movement of the dish away from the cage opening. Further, the size and shape of the flange and of the upper projection member are such that contact between the flange and the lower section of the slide rail limits rotation of the dish and contact between the flange-projection member assembly and the vertical stop member limits vertical movement of the dish. Additionally, the size and shape of the flange and the upper projection member are such that horizontal movement of the dish toward the entrance door of the cage is limited by the door when the door is closed.

In order to provide an improved cage the removable cup feeder assembly is attached to a cage. The dish holder is attached to a wall of the cage. It is attached such that the cup shaped dish may be slid onto and off of the slide rail through the door opening of the cage. The dish holder is further positioned so that horizontal movement of the cup shaped dish toward the door of the cage is limited when the cage door is closed.

The cup shaped dish should have an embossed floor. The embossings on the embossed floor provide secure footing for a bird standing on the floor.

The cup shaped dish has floor and wall intersections. Preferably, these intersections are radiused, rather than being orthogonal. The radiused floor and wall intersections improve the comfort of a bird standing within the dish. They also facilitate cleaning of the dish because the radiused intersections are easily reachable by a finger.

The walls of the cup shaped dish have upper surfaces proximal to the open end of the dish. These upper surfaces should also be radiused. The radiused upper surfaces of the dish walls improve the comfort of a bird perched upon one or more of the upper surfaces of the walls.

DRAWINGS

These and other features, aspects, and advantages of the present invention will become better understood with regard to the following description, appended claims, and accompanying drawings where:

DETAILED DESCRIPTION

Figure 5:
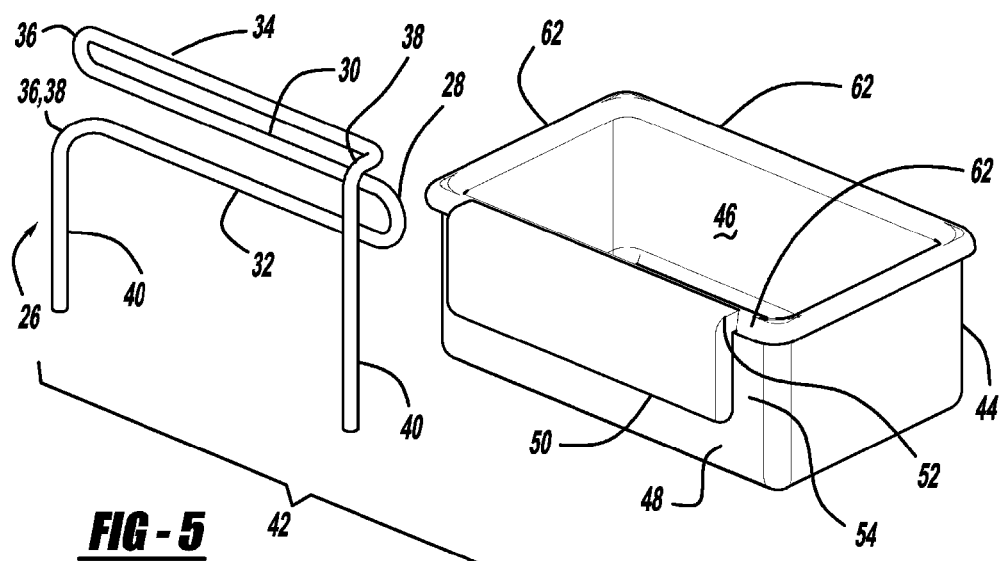
FIG. 5 is a rear perspective view of the removable cup feeder assembly of FIG. 1, showing the removable cup feeder assembly removed from the cage.
Figure 6:
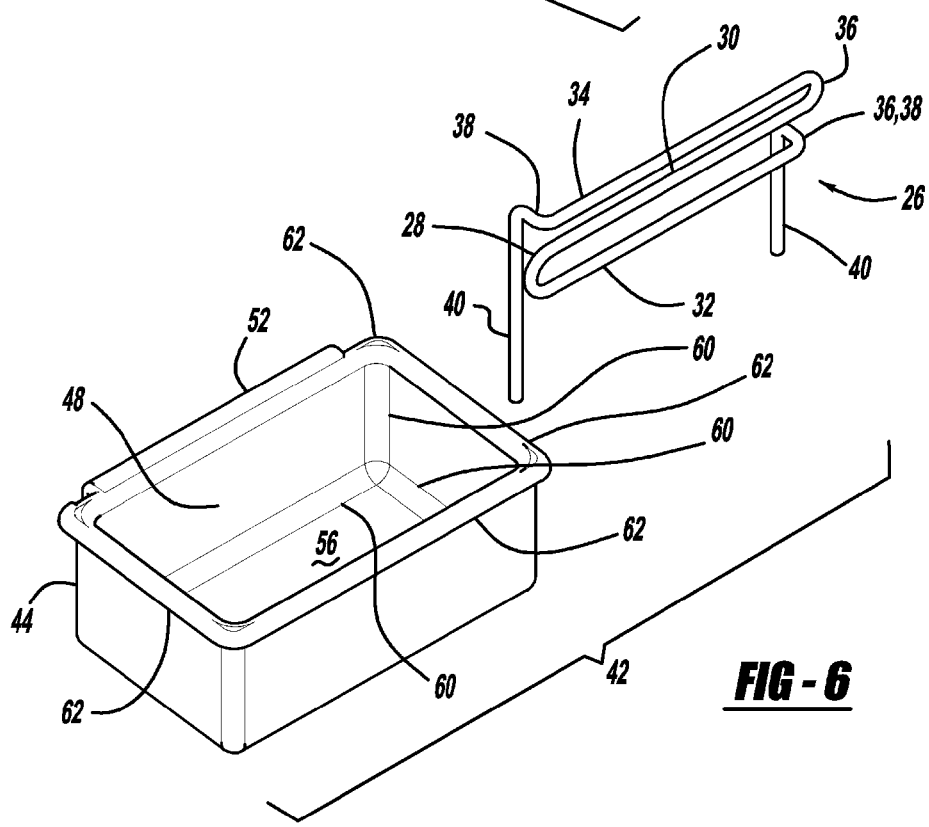
FIG. 6 is a front perspective view of the removable cup feeder assembly of the FIG. 1, showing the removable cup feeder assembly removed from the cage.
Figure 7:
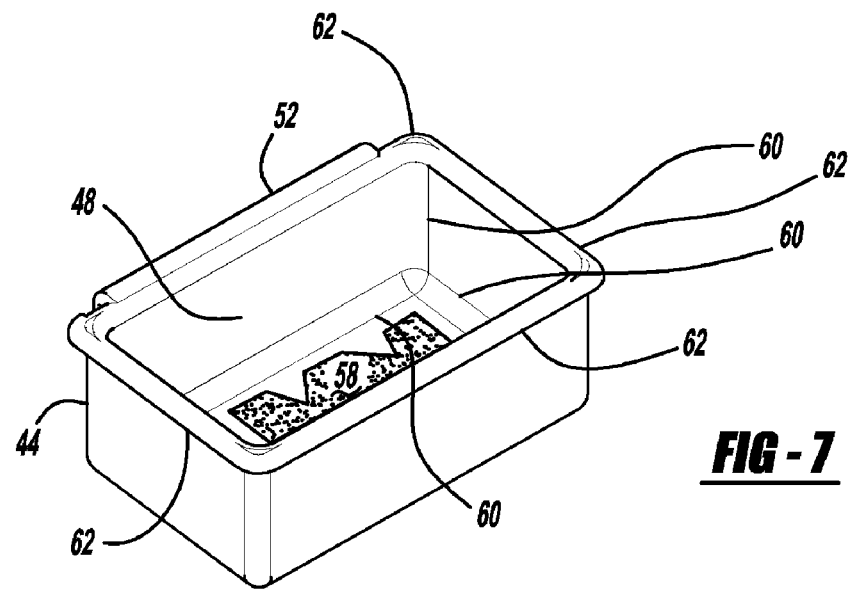
FIG. 7 is a perspective view of a cup shaped dish having an embossed floor.

The preferred embodiment of a removable cup feeder assembly 42 is shown in FIGS. 5–7. The removable cup feeder assembly 42 is intended to be used within a cage 20. The cage 20 has four walls 22 and an entrance door 24. An improved cage 20 is provided by installing a removable cup feeder assembly 42 within a cage. A removable cup feeder assembly 42 is comprised of a dish holder 26 and a cup shaped dish 44.

The dish holder 26 has a slide rail 28, a vertical stop member 34, at least one horizontal stop member 36 and at least one cage displacement member 38. The slide rail 28 has an upper section 30 and a lower section 32.

Preferably the dish holder 26 is fabricated by bending a malleable metallic rod. A U-shaped slide rail 28 is formed with the rod. The slide rail 28 slidingly fits within a slide tunnel 54 formed onto a cup shaped dish 44. The height and width of the slide rail 28 should approximately match the height and width of the slide tunnel 54. The slide rail 28 has an upper section 30 and a lower section 32, as shown in FIG. 6.

Figure 1:
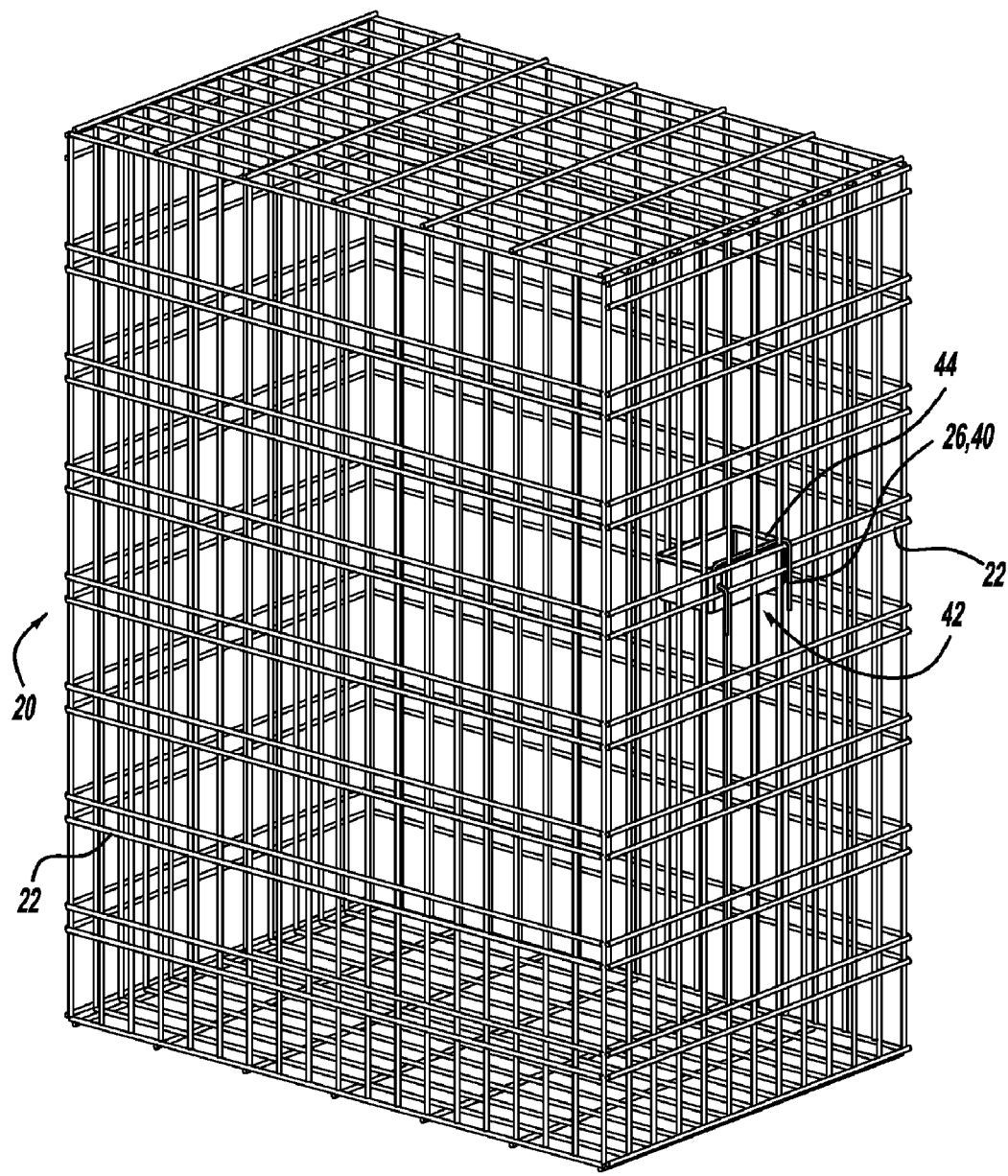
FIG. 1 is a perspective view of an improved cage having a removable cup feeder assembly.
Figure 2:
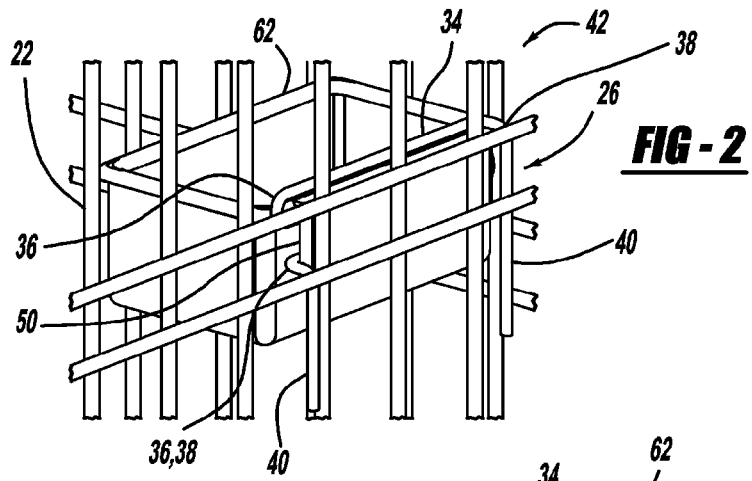
FIG. 2 is a rear perspective view of the removable cup feeder assembly of FIG. 1.
Figure 3:
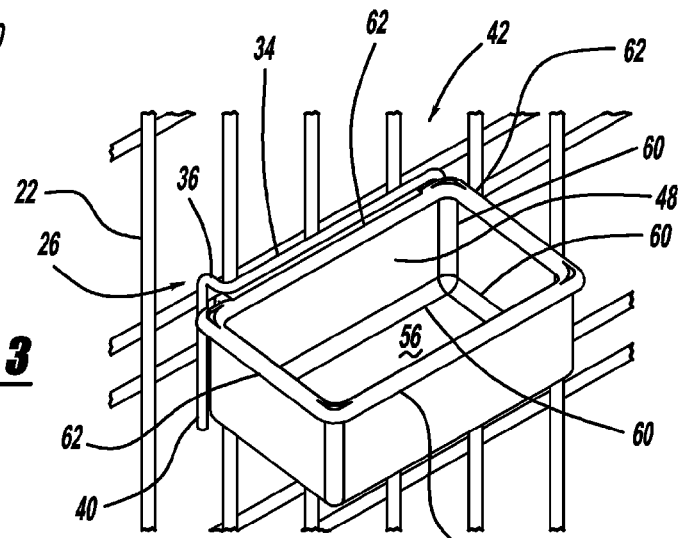
FIG. 3 is a front perspective view of the removable cup feeder assembly of FIG. 1.

The vertical stop member 34 and a contiguous horizontal stop member 36 are also U-shaped. The U shapes of the vertical stop member 34 and the slide rail 28 are elongated, as shown in FIG. 6. The bottoms of the U's of the vertical stop member 34 and the slide rail 28 are opposite each other, as shown in FIG. 6. The purpose of the vertical stop member 34 is to limit vertical movement of the dish 44 when it is installed onto the slide rail 28, but to allow horizontal sliding movement of the dish 44. Thus, the vertical stop member 34 must be spaced apart from the upper section 30 of the slide rail 28 accordingly. The vertical stop member 34 and the slide rail 28 should be coplanar. The term horizontal movement means movement in a direction parallel to the longitudinal axis of the slide rail 28. For example, when the dish 44 shown in FIG. 1 is removed or installed by sliding it along the slide rail 28, that is deemed to be horizontal movement. The term vertical movement of the dish 44 means movement in a direction perpendicular to the longitudinal axis of the slide rail 28.

The U termination of the vertical stop member 34 serves as a horizontal stop member 36, as shown in FIG. 5. When the slide tunnel 54 of the dish 44 is fit onto the slide rail 28 the horizontal stop member 36 contiguous with the vertical stop member 34 limits the horizontal movement of the dish 44. An additional horizontal stop member 36 should be formed between the lower section 32 of the slide rail 28 and a stanchion 40. This horizontal stop member 36 serves the same purpose as the first horizontal stop member 36. Additionally, this second horizontal stop member 36 serves as a cage displacement member 38.

Figure 4:
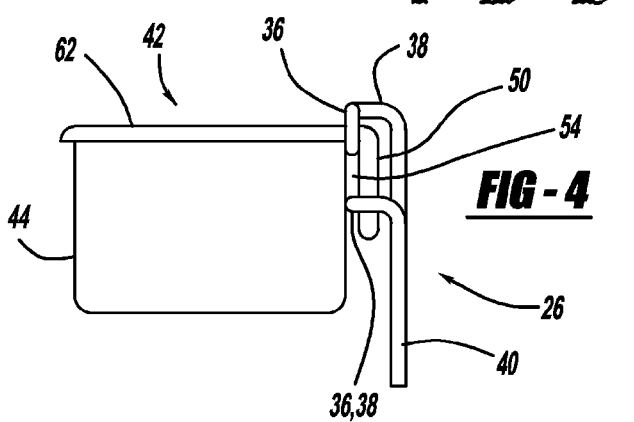
FIG. 4 is a side elevation view of the removable cup feeder assembly of FIG. 1.

FIG. 4 shows two cage displacement members 38. These cage displacement members 38 are bent from the metal rod. Their purpose is to provide room for a flange 50, which is attached to the dish 44, to fit between the slide rail 28 and a wall 22 of the cage 20. One cage displacement member 38 is contiguous with the lower section 32 of the slide rail 28. The other cage displacement member 38 is contiguous with the terminal end of the vertical stop member 34. Both cage displacement members 38 are contiguous with and attached to stanchions 40. The stanchions 40 provide a base for attaching the dish holder 26 to a wall 22 of the cage 20.

The cup shaped dish 44 should be molded from plastic. The cup shaped dish 44 has an open end 46 defined by a front wall, a back wall 48 and two side walls, as shown in FIG. 5. A flange 50 is attached to the open end 46 portion of the back wall 48. The flange 50 is attached to the back wall 48 by an upper projection member 52, as shown in FIG. 5. The plane of the flange 50 is parallel to the plane of the back wall 48. The flange 50, back wall 48 and the upper projection member 52 form a slide tunnel 54. The slide tunnel 54 is shaped to slidingly receive the slide rail 28. When the slide rail 28 is fit into the slide tunnel 54, the dish 44 is allowed to slide parallel to the longitudinal axis of the slide rail 28.

The flange 50, upper projection member 52 and slide tunnel 54 are sized and shaped such that the slide tunnel 54 may slidingly receive the slide rail 28. The size and shape of the flange 50, the upper projection member 52 and the slide tunnel 54 are also such that contact between the flange 50—projection member 52 assembly and at least one horizontal stop member 36 limits horizontal movement of the dish 44 away from the cage 20 opening. The size and shape of the slide rail 28, the flange 50, the upper projection member 52 and the slide tunnel 54 are such that contact between the flange 50 and the lower section 32 of the slide rail 28 limits rotation of the dish 44 when the dish 44 is installed onto the slide rail 28. Additionally, contact between the flange 50—projection member 52 assembly and the vertical stop member 34 limits vertical movement of the dish 44 due to the size and shape of the slide rail 28, the flange 50, the upper projection member 52 and the slide tunnel 54.

The dish 44 and the dish holder 26 are dimensioned such that horizontal movement of the dish 44 toward the entrance door 24 of the cage 20 is limited by the door 24 when the door 24 is closed. Horizontal movement of the dish 44 in the other direction is limited by one or both of the horizontal stop members 36.

Figure 8:
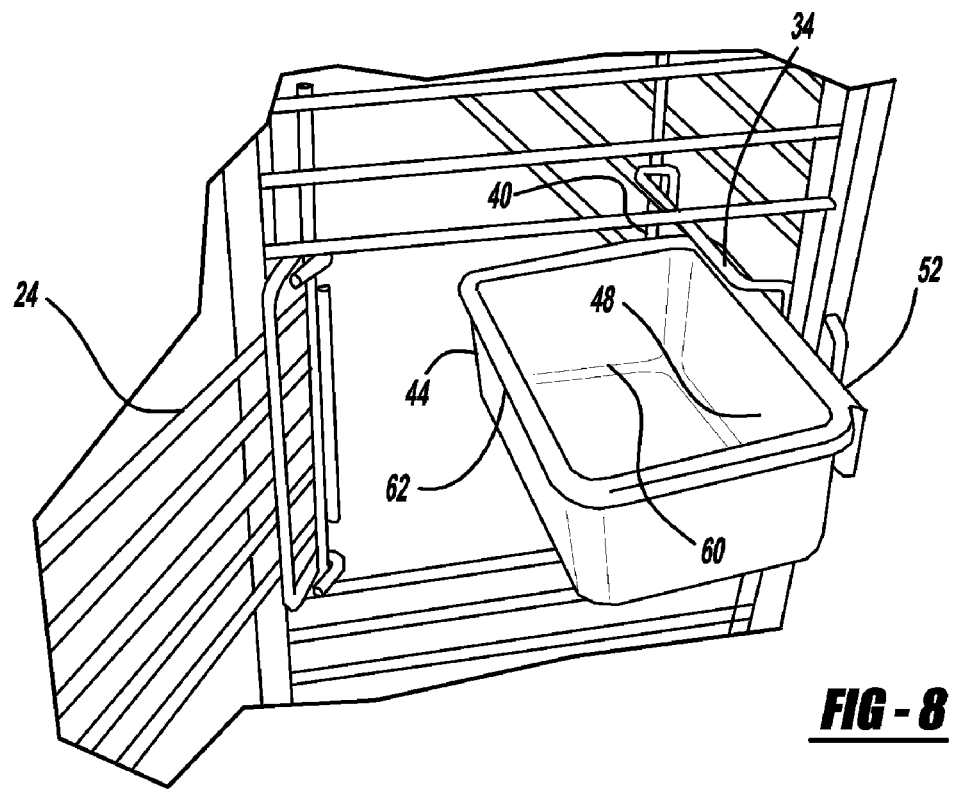
FIG. 8 is a partial perspective view of an improved cage having a removable cup feeder, showing a cup shaped dish partially installed on the slide rail of a dish holder and further showing an open entrance door of the cage.

The dish holder 26 is attached to a wall 22 of the cage 20. Preferably, this is accomplished by welding the stanchions 40 to the wall 22. The dish holder 26 is positioned on the cage 20 wall 22 so that the cup shaped dish 44 may be installed and removed through the door 24 of the cage 20. FIG. 8 shows a cup shaped dish 44 being inserted through the door 24 opening of a cage 20 and installed onto a slide rail 28. The dish holder 26 should also be positioned on the wall 22 so that the door 24 of the cage 20 traps the dish 44 into a confined position when the door 24 is closed. In other words, only limited movement of the dish 44 toward the door 24 should be allowed when the door 24 is closed.

The cup shaped dish 44 has a floor 56. The floor 56 should be embossed. Embossings 58 may be molded into the floor, as shown in FIG. 7. The embossings 58 may be comprised of raised alphabetic characters. This allows a message or a logo to be displayed. An embossed floor 56, 58 provides secure footing for a bird standing on the floor 56.

The cup shaped dish 44 has floor and wall intersections 60, as shown in FIGS. 5–7. In traditional bird feeders the floor and wall intersections are orthogonal. This makes it difficult to clean the dish and it makes it difficult for a bird to retrieve food or water from the crevices defined by the intersections. Preferably, the floor and wall intersections 60 are radiused, as shown in FIGS. 5–7. The radiused intersections 60 improve the comfort of a bird standing within the cup shaped dish 44 and facilitate cleaning of the cup shaped dish 44. A person can more easily reach all of the corners of a dish 44 having radiused floor and wall intersections 60, as compared to a dish having orthogonal floor and wall intersections.

The cup shaped dish 44 has upper wall surfaces 62. These upper wall surfaces 62 are proximal to the open end 46 of the dish 44. The upper wall surfaces 62 should also be radiused, as shown in FIGS. 5–8. Radiused upper wall surfaces 62 improve the comfort of a bird perched upon one or more of the upper wall surfaces 62.

The method of installing a cup shaped dish 44 onto a dish holder 26 mounted to a cage 20 is shown in FIG. 8. The door 24 of the cage 20 is opened. The slide tunnel 54 of the cup shaped dish 44 is fit over the slide rail 28. The cup shaped dish 44 is then pushed into the cage 20 horizontally until it is stopped by a horizontal stop member 36. The door 24 is closed trapping the dish 44 into a confined position. A bird within the cage 20 may strike every available part of the dish 44 in every available direction, but will not be able to displace the dish 44 from its mounted position. The time required between door 24 opening and door 24 closing is minimal.

In order to service or clean the dish 44, the door 24 is again opened. The dish 44 can be quickly removed by pulling it horizontally out of the cage 20. Once the dish 44 is removed from the cage 20, it can be cleaned and refilled with water or food. The ease of cleaning is enhanced by the radiused floor and wall intersections 60. It is much easier to remove material from a dish 44 having radiused floor and wall intersections 60, as compared to a dish having orthogonal floor and wall intersections. At times it is very difficult to remove material from floor and wall intersections where those intersections are orthogonal. Once the cup shaped dish 44 is removed, cleaned and serviced it can be quickly reinstalled as described above. Because of the minimal time required for the door 24 to be open during servicing, it will be very difficult for a bird to escape or attack its handler.

Although the invention has been shown and described with reference to certain preferred embodiments, those skilled in the art undoubtedly will find alternative embodiments obvious after reading this disclosure. For example, the slide rail 28 and the vertical stop member 34 need not be parts of U-shaped structures. With this in mind, the following claims are intended to define the scope of protection to be afforded the inventor, and those claims shall be deemed to include equivalent constructions and methods insofar as they do not depart from the spirit and scope of the present invention.

What is claimed is:

1. A removable cup feeder assembly for use on a cage having an entrance door, said removable cup feeder assembly comprising:
    a dish holder for attachment to a wall of the cage, said dish holder having:
        a slide rail having an upper section and a lower section, for removably retaining a dish;
        a vertical stop member for limiting vertical movement of a dish;
        at least one horizontal stop member for limiting horizontal movement of a dish away from the entrance door of the cage; and
        at least one cage displacement member for displacing the slide rail from a wall of the cage; and
    a cup shaped dish having an open end defined by a front wall, a back wall and two side walls, said dish having a flange attached to the open end portion of the back wall by an upper projection member such that the plane of the flange is parallel to the plane of the back wall, said flange and said upper projection member being sized and shaped such that a slide tunnel for slidably receiving the slide rail is formed wherein the tunnel of the dish is slidably attachable to the slide rail such that contact between the flange-projection member assembly and the at least one horizontal stop member limits horizontal movement of the dish away from the cage opening, wherein contact between the flange and the lower section of the slide rail limits rotation of the dish, wherein contact between the flange-projection member assembly and the vertical stop member limits vertical movement of the dish and wherein horizontal movement of the dish toward the entrance door of the cage is limited by the door when the door is closed.

2. The removable cup feeder assembly of claim 1, wherein the cup shaped dish has an embossed floor to provide secure footing for a bird standing on the floor.

3. The removable cup feeder assembly of claim 1, wherein the floor and wall intersections of the cup shaped dish are radiused to improve the comfort of a bird standing within the cup shaped dish and to facilitate cleaning of the cup shaped dish.

4. The removable cup feeder assembly of claim 1, wherein the upper surfaces of the walls proximal to the open end of the cup shaped dish are radiused to improve the comfort of a bird perched upon one or more of said upper surfaces.

5. An improved cage having a removable cup feeder, said improved cage comprising:
    a cage having an entrance door;
    a dish holder attached to a wall of the cage, said dish holder having:
        a slide rail having an upper section and a lower section, for removably retaining a dish;
        a vertical stop member for limiting vertical movement of a dish;
        at least one horizontal stop member for limiting horizontal movement of a dish away from the entrance door of the cage; and
        at least one cage displacement member for displacing the slide rail from a wall of the cage; and
    a cup shaped dish slidably attached to the slide rail of the dish holder, said cup shaped dish having an open end defined by a front wall, a back wall and two side walls, said dish having a flange attached to the open end portion of the back wall by an upper projection member such that the plane of the flange is parallel to the plane of the back wall, said flange and said upper projection member being sized and shaped such that a slide tunnel for slidably receiving the slide rail is formed wherein the tunnel of the dish is slidably attachable to the slide rail such that contact between the flange-projection member assembly and the at least one horizontal stop member limits horizontal movement of the dish away from the cage opening, wherein contact between the flange and the lower section of the slide rail limits rotation of the dish, wherein contact between the flange-projection member assembly and the vertical stop member limits vertical movement of the dish and wherein horizontal movement of the dish toward the entrance door of the cage is limited by the door when the door is closed.

6. The improved cage of claim 5, wherein the cup shaped dish has an embossed floor to provide secure footing for a bird standing on the floor.

7. The improved cage of claim 5, wherein the floor and wall intersections of the cup shaped dish are radiused to improve the comfort of a bird standing within the cup shaped dish and to facilitate cleaning of the cup shaped dish.

8. The improved cage of claim 5, wherein the upper surfaces of the walls proximal to the open end of the cup shaped dish are radiused to improve the comfort of a bird perched upon one or more of said upper surfaces.

* * * * *